Sept. 29, 1942.    P. C. EMMONS    2,296,987
CONTROLLABLE PITCH PROPELLER
Filed Sept. 23, 1940    2 Sheets-Sheet 1
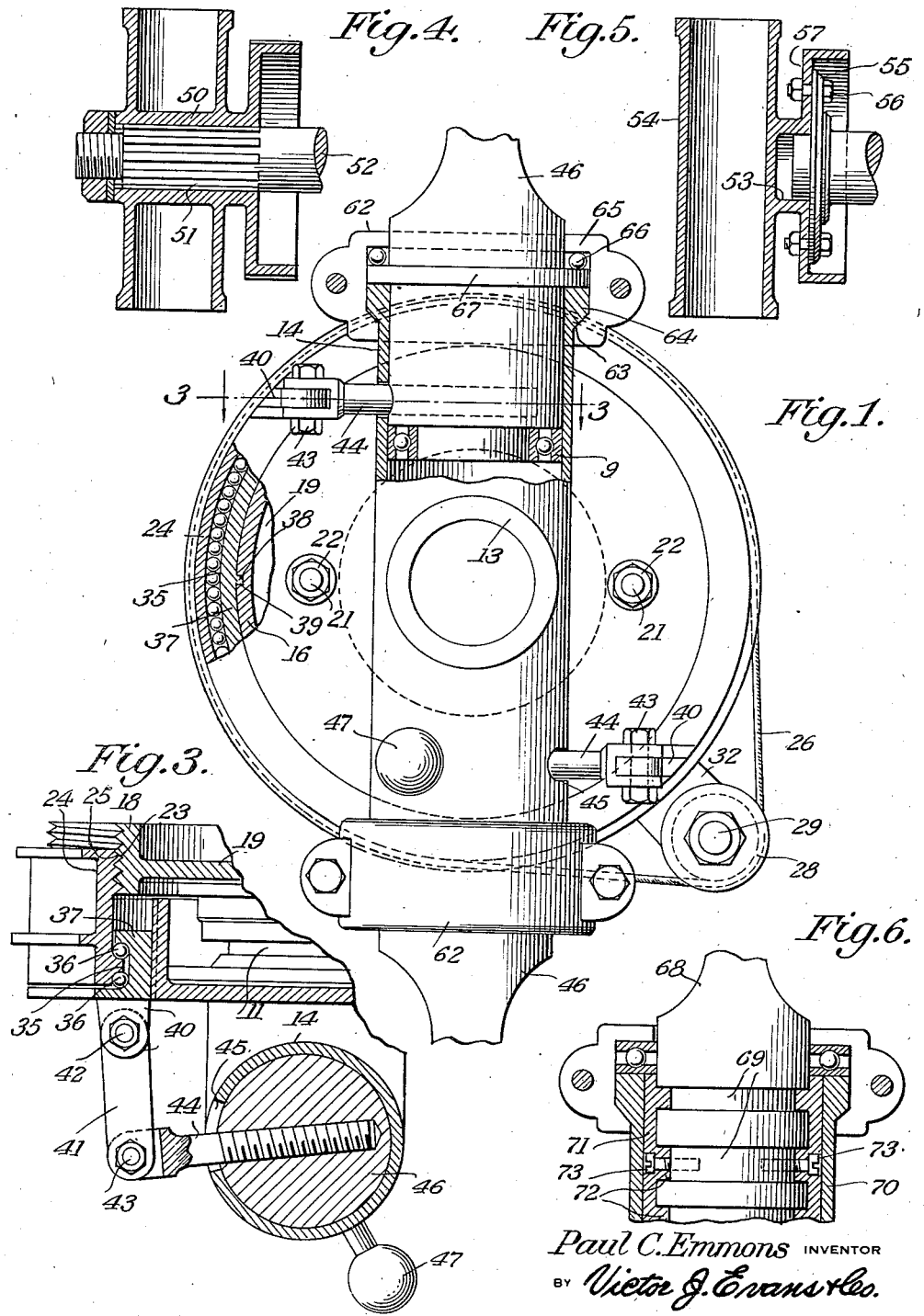
Paul C. Emmons INVENTOR
BY Victor J. Evans & Co.
ATTORNEYS Sept. 29, 1942.   P. C. EMMONS   2,296,987
CONTROLLABLE PITCH PROPELLER
Filed Sept. 23, 1940   2 Sheets-Sheet 2

Paul C. Emmons
INVENTOR
BY Victor J. Evans & Co.
ATTORNEYS

Patented Sept. 29, 1942

2,296,987

UNITED STATES PATENT OFFICE 2,296,987

CONTROLLABLE PITCH PROPELLER

Paul C. Emmons, West Lafayette, Ind.

Application September 23, 1940, Serial No. 357,955

1 Claim. (Cl. 170—163)

This invention relates to controllable pitch propellers and has for an object to provide a simplified means for controlling the pitch of the propeller blades while in flight or on the ground, either with propeller rotating or stopped, with slight manual effort.

A further object is to provide a hub and actuating means which may be attached to various types of engine shafts and engines, in some cases without and in others with but slight alterations, and which will include an annular flange of relatively large diameter upon which a bearing race container and adjusting ring is mounted in surrounding relation thereto, the adjusting ring being connected to the bearing race container which is in turn connected to the crank arm on the blades so that only a slight movement of the adjusting ring fore or aft is necessary to adjust the pitch of the blades.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification:

Figure 1 is a front elevation of a controllable pitch propeller showing only two blades constructed in accordance with the invention with portions broken away.

Figure 3 is a detail cross sectional view showing the adjusting ring, hub annular flange, fixed ring for moving the adjusting ring fore and aft, bearing race container carried by the adjusting ring and the crank means connecting the bearing race container to one of the propeller blades.

Figure 4 is a detail sectional view showing the hub of the device secured to a splined engine shaft.

Figure 5 is a detail sectional view showing the hub secured to a flanged engine shaft.

Figure 6 is a detail sectional view showing a different form of retaining means for the propeller blade from that shown in Figure 1.

Figure 7:
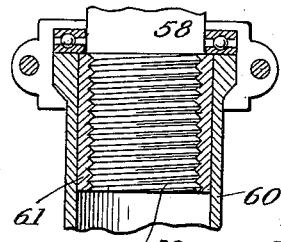
Figure 7 is a detail sectional view showing a threaded shank propeller blade secured to the hub.

Referring now to the drawings in which like characters of reference designate similar parts in the various views, 10 designates an aircraft engine housing, 11 the engine shaft and 12 a flange on the end of the shaft.

In carrying out the invention a hub 13 is provided having laterally disposed propeller blade receiving socket members 14, and having on the inner end an integral disk 15 provided with a peripheral flange 16 adapted to be disposed concentrically with the axis of the shaft 11 when the disk 15 is bolted to the flange 12 of the shaft by bolts 17.

A fixed ring 18 is provided internally with a flange 19 having openings 20 to receive threaded studs 21 which project from the housing 10. Nuts 22 are applied to the studs to secure the fixed ring to the housing. The fixed ring is provided on its periphery with external screw threads 23.

An adjusting ring 24 is mounted on the fixed ring in surrounding relation thereto and is provided with internal screw threads 25 which engage the screw threads 23 of the fixed ring. When the adjusting ring is turned on its axis, it will be moved fore or aft by the screw thread connection between it and the fixed ring.

For turning the adjusting ring a cable 26 is wrapped in a number of convolutions around the adjusting ring and is confined between stop flanges 27 on the ring. The cable is a closed loop, a portion of which is wound in a number of convolutions around a pulley 28 which is spaced from the adjusting ring and is keyed to a shaft 29, one end of which is provided with screw threads 30 which are engaged with screw threads 31 in an opening formed in a lug 32 which projects from or is attached to the engine housing 10. The threaded end of the shaft is connected by a flexible coupling 33 to a rod 34 which leads to the operator's compartment and is adapted to be manually turned to turn the pulley 28, in either direction, for imparting rotation to the adjusting ring through the cable 26. One end of cable 26 is attached to the adjusting ring 24 and the other is attached to the pulley 28. The pulley 28 and shaft 29 are capable of a reciprocable travel which allows them to follow that of the adjusting ring 24 by means of the screw-threads 30 and 31, thus eliminating any binding of cable 26.

The adjusting ring is provided on its inner periphery with an internally extending short flange 35 which projects between spaced ball bearings 36 disposed in a bearing race container 37, which is mounted on the flange 16 of the disk 15 in surrounding relation thereto. The bearing race container is provided with a spline 38 which extends parallel to the axis of the engine shaft and fits in a groove 39 formed in the flange 16 of the disk 15, as best shown in Figure 1.

The bearing race container 37 thus rotates as a unit with the hub disk 15 which is fixed to the engine shaft, and may move fore or aft as a unit with the adjusting ring 24 on the flange 16 of the hub disk when the adjusting ring is moved by the screw threads 25 and 23 of the adjusting ring and fixed ring respectively.

As best shown in Figure 3, the bearing race container 37 is provided with a plurality of ears 40 to which respective links 41 are connected by pivot pins 42. The free ends of the links are pivotally connected by respective pivot pins 43 to respective crank arms 44 which are engaged through slots 45 in the hub socket members 14 and are fixed to respective propeller blades 46 in any preferred manner. When the bearing race container 37 is moved fore or aft the crank means just described turns the propeller blade about its longitudinal axis to vary the pitch accordingly.

Figure 2:
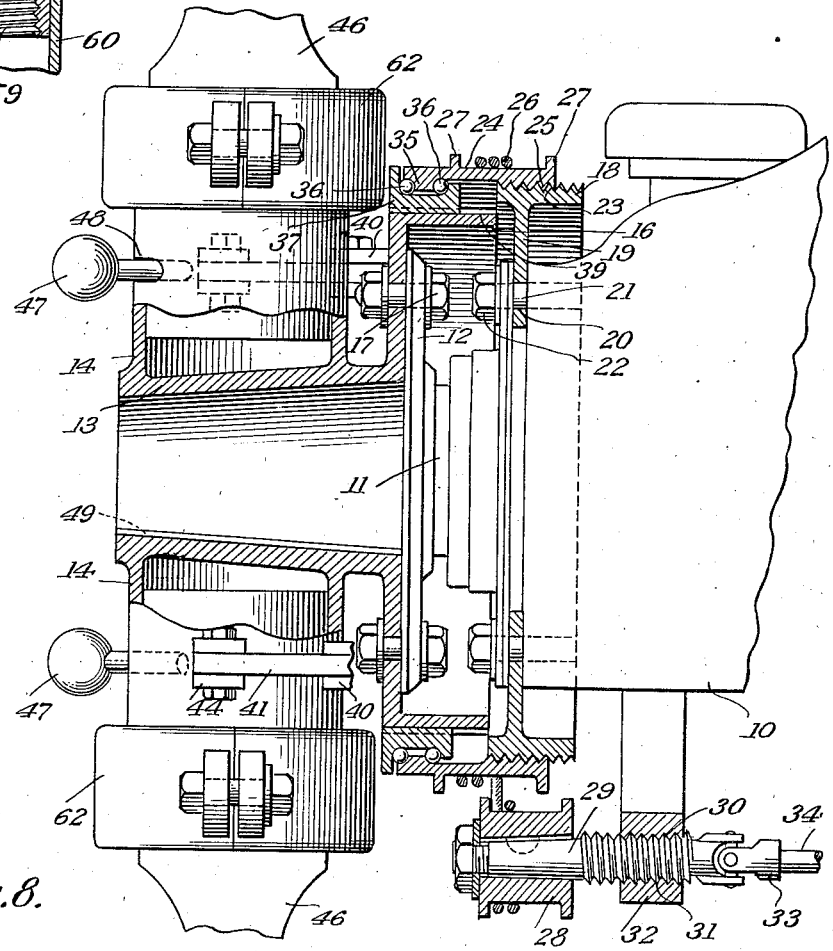
Figure 2 is a side elevation of the controllable pitch propeller with portions broken away and showing a tapered shaft hub as it may be mounted on a flanged shaft.

To counterbalance, if necessary, the torque or twisting tendency of the propeller blade, caused by air loads and the resultant centrifugal forces of the blade mass, weights 47 may be secured to the inner ends of the propeller blades and project through respective slots 48 in socket members 14, as best shown in Figure 2 to make this counterbalancing possible.

In some instances propeller blades 58 may be threaded as shown at 59 in Figure 7. Blades of this type may be mounted in socket members 60 by screwing on an internally threaded sleeve 61 before inserting the propeller blade into the socket member. This provides a means for installing the necessary bearing.

For securing blades in the socket members as shown in Figures 1 and 2 split ring clamps 62 are provided with internal shoulders 63, best shown in Figure 1, which engage against a collar 64 formed on the upper end of the respective socket member 14. The sections of the split ring clamp are provided with respective flanges 65 at the top which extend over thrust bearings 66 which are supported upon a flange 67 formed on the blade and which rest upon the top of the collar 64.

The inner end of the blade may, if desired, be disposed upon a bearing assembly 9 which is secured to the shank end of the blade and bears upon the socket member 14. The bearing assembly permits easier turning of the blade about its longitudinal axis when the adjusting ring is moved on the fixed ring as previously described.

Another modified form of blade retaining means is shown in Figure 6 to be used when the blade 68 is provided with spaced circumferential slots 69. To secure such a blade in a socket member 70 which is similar to the socket member 14, a liner 71, provided with annular inwardly extending ribs 72, is attached to the blade shank before inserting the blade into the socket member 70. The liner may be made in two similar halves to permit assembling or disassembling. Set screws 73 are engaged through the liner and threaded into the blade to secure the liner to the blade, and the liner has a free, or turning fit, in the socket member.

Figure 8:
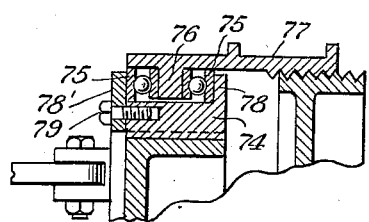
Figure 8 is a detail sectional view showing a modified means of securing the bearing race container to the adjusting ring.

In some instances the bearing race container 74 shown in Figure 8 may be provided with spaced conventional bearing assemblies 75 which receive between them the flange 76 of the adjusting ring 77. The assemblies may be confined between the integral flange 78 on the bearing race container and a retaining ring 78' which is secured to the outer side of the bearing container by set screws 79.

Figure 9:
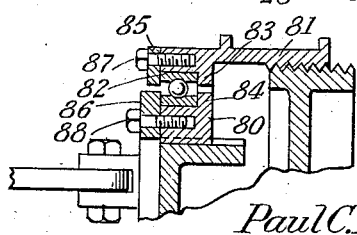
Figure 9 is a detail sectional view of another modified means of securing the bearing race container to the adjusting means.

Another modified means for securing the bearing race container 80 to the adjusting ring 81 is shown in Figure 9. In this figure a single conventional bearing assembly 82 is confined between flanges 83 and 84 integral with the adjusting ring 81 and bearing race container 80, and retaining rings 85 and 86 which are secured respectively to the adjusting ring and bearing race container by respective set screws 87 and 88.

Since the operation of the parts has been described as the description of the parts progressed, it is thought the invention will be fully understood without further explanation.

What is claimed is:

The combination with an aircraft engine and engine shaft, of a hub mounted for rotation with the shaft and having an annular flange concentric with the shaft, propeller blades secured to the hub for limited rotation on longitudinal axes, an externally threaded fixed ring on the engine concentric with the shaft, an internally threaded adjusting ring on the fixed ring adapted to be moved fore or aft on the fixed ring by the threads of both rings when the adjusting ring is turned axially, said adjusting ring having a radially disposed annular flange concentric with the shaft, a bearing race container splined on the hub annular flange, bearing means coacting with the adjusting ring flange to connect the bearing race container for fore or aft movement as a unit with the adjusting ring, ears extending from the bearing race container, crank arms extending from the propeller blades pivotally connected to the ears adapted to rotate the blades axially when the bearing race container is moved fore or aft to vary the pitch of the blades, and manually controlled means for turning the adjusting ring axially on the fixed ring, said means comprising an endless cable having a portion coiled on the adjusting ring, a pulley upon which another portion of the cable is coiled, a threaded shaft for the pulley, a lug projecting from the engine having a threaded opening receiving said shaft, and a manually turnable rod flexibly connected to the shaft to turn the shaft and pulley for reeling the cable in either direction on the adjusting ring to turn the adjusting ring.

PAUL C. EMMONS.